Oct. 28, 1958   W. H. GOMEZ   2,858,126
MOTION TRANSMITTING APPARATUS
Filed Jan. 5, 1954

INVENTOR.
WILLIAM H. GOMEZ
BY *Tyler & Roundy*

ATTORNEY

United States Patent Office 2,858,126
Patented Oct. 28, 1958

2,858,126

MOTION TRANSMITTING APPARATUS

William H. Gomez, Bronx, N. Y., assignor to Bendix Aviation Corporation, Teterboro, N. J., a corporation of Delaware Application January 5, 1954, Serial No. 402,367

6 Claims. (Cl. 267—1)

This invention relates to motion transmitting apparatus utilizing flexible sealing means and particularly to apparatus for transmitting motion or power through a fluid or pressure tight wall.

Heretofore, motion transmitting apparatus have been of two general types. In one type the rocking arm or lever means is secured to the flexible diaphragm means and is pivotally mounted by means of pivot pins, knife edges, bearings, or the like. The operation of such arrangements is limited, however, by the inherent friction and susceptibility to vibration.

In the second type the rocking arm or lever means is secured to the flexible diaphragm means and is pivotally supported by means of cantilever or flexure spring means in lieu of pivot pins or bearings. However, the normal bending action of cantilever or flexure springs has a pronounced non-linear effect upon the displacement characteristic of the rocking arm, even though the pivot axis should remain fixed. A non-linear relationship results between the applied input force and the angular output displacement. Such non-linearity cannot be tolerated in those applications which require a relatively high degree of accuracy. In one construction of the second type the rocking arm is secured both to a diaphragm and on one side of the diaphragm to the midportion of a flat U-shaped flexure member which has its ends secured to the wall on the other side of the diaphragm and lies in a plane perpendicular to the plane of the diaphragm, whereby the application of a force to the rocking arm causes the flexure member to flex or bend about an axis lying in the plane of the diaphragm, the stress developed in the flexure member being primarily one of flexure which exerts the above-mentioned non-linear effect upon the deflection characteristic of the rocking arm.

It is an object of the present invention to provide improved motion transmitting apparatus.

It is another object of the invention to provide motion transmitting apparatus capable of a high degree of accuracy.

It is another object of the invention to provide motion transmitting apparatus wherein the pivotal support for the motion transmitting arm or lever means includes spring means which are free of flexure or bending stress when a force is applied to the lever means.

It is another object of the invention to provide motion transmitting apparatus wherein the pivotal support for the lever means includes spring means adapted to undergo a type of stress which exerts a linear influence upon the angular displacement characteristic of the lever means.

It is still another object of the invention to provide motion transmitting apparatus wherein pure torsion spring means are utilized for pivotally supporting the motion transmitting lever means.

The above and other objects and advantages of the present invention will appear more fully hereinafter from a consideration of the detailed description which follows, taken together with the accompanying drawing, wherein specific embodiments of the invention are illustrated and like numerals designate corresponding parts, in which.

Figure 1:
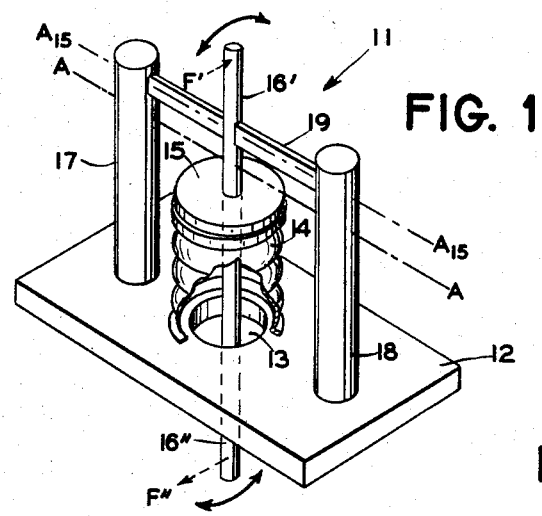
Fig. 1 is an isometric view of one form of the invention.

Referring to Fig. 1, there is provided motion transmitting apparatus, generally designated by the numeral 11, for transmitting motion through a wall 12 separating two compartments which are to be hermetically sealed from each other and which may contain fluids at different pressures. Wall 12 has a circular aperture 13 which is hermetically sealed by a flexible metal rocking bellows 14 having its fixed end rigidly and hermetically secured to wall 12 and its movable end hermetically sealed by a metal cover plate 15.

Passing centrally through aperture 13 and along the longitudinal axis of the bellows is the motion transmitting arm or lever means 16, preferably comprising separate axially aligned rods 16' and 16" rigidly attached by solder or other means to opposite sides respectively of the bellows cover plate 15. If desired, a single rod may be employed instead and arranged to pass through a central aperture provided in the cover plate, the rod being secured in the aperture to provide a hermetic seal. Rigid posts 17 and 18 are attached rigidly by solder or other means to wall 12 on diametrically opposite sides of the bellows. The posts extend in directions parallel to the longitudinal axis of the bellows so that their axes lie in a plane which includes the longitudinal axis of the bellows.

Rigidly attached to the upper ends of posts 17 and 18, respectively, are the ends of a pure torsion spring in the form of a resilient metal strip or ribbon 19. For example, the ends of spring 19 may be soldered to the respective posts or fitted securely within suitable slots in the respective posts. The midportion of spring 19 passes through a diametric slot in arm 16' and may be rigidly attached thereto by suitable means such as solder or clamps. In one construction a spring 19 of carbon steel, clock spring steel in particular, with a very high ultimate strength and a very high elastic limit was found to produce especially good results. A beryllium-copper alloy also proved to be quite satisfactory. In one construction the length of spring 19 between the posts was approximately ⅝ inch, the width approximately ³⁄₃₂ inch and the thickness approximately 0.010 inch.

In the apparatus of Fig. 1 the torsion spring prevents collapse of the bellows and prevents movement of the bellows or arm means along its longitudinal axis, due to change in the differential fluid pressure across the bellows. When no input force is applied to the arm means, the spring 19 is under no stress as shown in Fig. 1. When an input force F' is applied to the arm means in a direction generally perpendicular to the plane which includes the axes of the arm means and the posts 17 and 18, spring 19 is subjected to a shear stress which is pure torsional stress and twists about its longitudinal axis $A_{15}$—$A_{15}$ with the greatest distortion occurring at its midportion while the arm means is constrained to pivot or rock about a predetermined fixed pivot axis A—A parallel to axis $A_{15}$—$A_{15}$ and intersecting the longitudinal axis of the bellows and arm means at a point intermediate cover plate 15 and axis $A_{15}$—$A_{15}$. The exact location of pivot axis A—A depends, of course, upon the geometry of the particular elements employed, as will be understood by those skilled in the art. Since there is no flexure or bending stress developed in spring 19 and the stress is instead one of pure torsion, spring 19 will exert a linear influence upon the displacement characteristic of the motion transmitting arm means. Accordingly, the angular output displacement of the motion take-off point on arm 16″ will be a linear function of the magnitude of the applied input force F′. The extent of change in output displacement per unit change in the applied force F′ is determined, of course, by the relative lengths of the moment arms on each side of the pivot axis.

Figure 2:
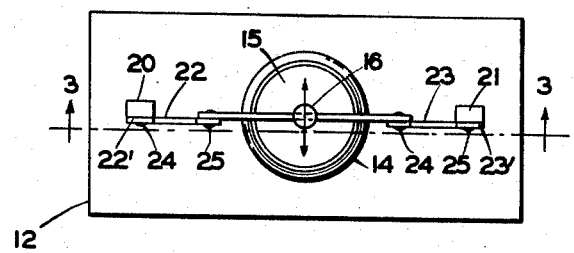
Fig. 2 is a top plan view, partly in section, of another form of the invention.
Figure 3:
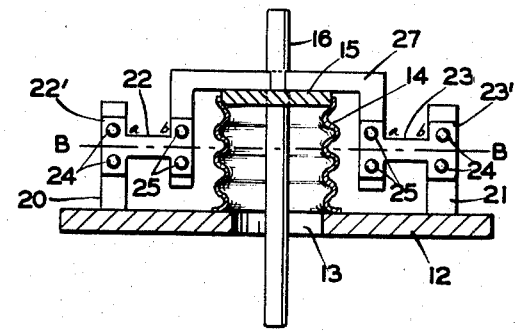
Fig. 3 is a side view of the apparatus of Fig. 2 taken on the line 3—3.

In the construction of Figs. 2 and 3, there is provided more compact pivotal support means including a pair of rigid posts 20 and 21 attached to the wall 12 on diametrically opposite sides of the bellows and a pair of pure torsion springs in the form of flat resilient metal members 22 and 23. In order to provide sturdy means of attachment, springs 22 and 23 each have four lug or flange portions 22′ and 23′, respectively, provided with four rivet holes. One end of springs 22 and 23 is rigidly attached by means of a pair of rivets 24 to a respective one of the posts 20 and 21. The other end of springs 22 and 23 is rigidly attached by means of a pair of rivets 25 to a respective end of a rigid yoke member 27. The midportion of member 27 passes through a diametric slot in the arm means 16 above cover plate 15 and is rigidly attached to the arm means by suitable means such as solder or clamps. Springs 22 and 23 are mounted so that they have a common longitudinal axis B—B which is substantially perpendicular to the longitudinal axis of the bellows and arm means and preferably midway between the ends of the bellows. Springs 22 and 23 may be composed of the same metal as spring 19. In one construction, satisfactory results were obtained when each of the springs 22 and 23 had a width of approximately ⅛ inch, a thickness of approximately 0.010 inch, and insofar as torsion is concerned, an effective length between points $a$ and $b$ of approximately ¼ inch.

The torsion springs 22 and 23 in conjunction with the yoke member 27 prevent axial movement of the bellows and arm means along their longitudinal axis in response to changes in differential fluid pressure across the bellows and constrain the arm means to pivot or rock about axis B—B as a fixed pivot axis when an input force is applied to the upper portion of the arm means in a direction substantially perpendicular to the plane which includes the longitudinal axes of the bellows and posts. When the input force is applied, the portion of springs 22 and 23 between points $a$ and $b$ are twisted and undergo pure torsional stress, thereby exerting a linear influence upon the displacement characteristic of the arm means. The angular displacement of the motion take-off point on the lower portion of the arm means is accordingly a linear function of the magnitude of the applied input force.

Figure 4:
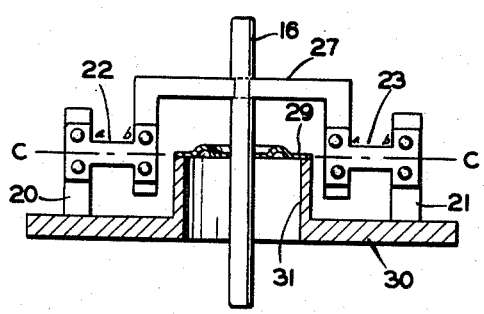
Fig. 4 is a side view illustrating a modification of the apparatus of Figs. 2 and 3.

In the apparatus of Fig. 4 a flexible metal rocking diaphragm 29 is employed in lieu of a rocking bellows and the wall 30 has a rigid annular flange portion 31. The diaphragm is rigidly attached to the top of the flange so as to seal hermetically the opening in the flange and lies substantially in a plane which includes the longitudinal axis C—C of the pure torsion springs 22 and 23. The arm means are rigidly attached to the center of the diaphragm. Upon the application of an input force to the arm means, the latter is constrained to pivot or rock about axis C—C as a fixed pivot axis, the springs being twisted about their longitudinal axis C—C and undergoing pure torsional stress between points $a$ and $b$, whereby the output displacement of the arm means is a linear function of the applied input force.

Although certain embodiments of the invention have been illustrated and described in detail by way of example, it is to be expressly understood that the invention is not limited thereto. For example, the point of application of the input force to the arm means and the motion take-off point may be interchanged. Similarly, the lever or arm means may comprise either a single lever rigidly attached to the flexible diaphragm means and passing hermetically therethrough or a pair of axially aligned levers rigidly attached to the diaphragm means. The phrase "diaphragm means" employed in the specification and claims is to be understood to include bellows as well as diaphragms. In the apparatus of Figs. 2-4 the yoke member may be offset or recessed so that the common longitudinal axis of the pair of torsion springs passes precisely through the center of the arm means so as to intersect the longitudinal axis of the arm means. Specific spring dimensions, etc. have been given simply by way of example. Various changes may be made in the design and arrangement of the elements without departing from the spirit and scope of the invention, as will be understood by those skilled in the art.

What is claimed is:

1. In motion transmitting apparatus, a member having an aperture therein, a flexible bellows having one end closed and the other end secured to said member to seal said aperture, pivotable lever means rigidly attached to said one end of said bellows and extending along the longitudinal axis of said bellows away from said one end in one direction and away from said one end in the opposite direction through said bellows and said aperture, and means for pivotally supporting said lever means comprising rigid support means having two portions fixedly positioned respectively on diametrically opposite sides of said bellows, a rigid yoke member having its midportion rigidly attached to said lever means adjacent to said one end of the bellows and having its ends located on diametrically opposite sides of said bellows intermediate the ends thereof, and a pair of rectilinear torsion springs each having one end rigidly attached to a respective portion of said rigid support means and the other end rigidly attached to a respective end of said yoke member so that said springs have a common longitudinal axis which is substantially perpendicular to the longitudinal axis of said bellows intermediate the ends thereof to prevent axial movement of said lever means and said bellows while permitting twisting of said springs about said common spring axis and pivoting of said lever means about said common spring axis.

2. Apparatus according to claim 1 wherein said rigid support means comprises a pair of posts rigidly attached at one end to said member and extending substantially parallel with the longitudinal axis of said bellows.

3. Apparatus according to claim 1 wherein said lever means comprises a lever member which passes substantially perpendicularly through the center of said one end of the bellows.

4. Apparatus according to claim 1 wherein said lever means comprises a first lever member passing through said aperture and bellows and rigidly attached to the inner surface of said one end and a second lever member in axial alignment with said first member and rigidly attached to the outer surface of said one end.

5. In motion transmitting apparatus, a member having an aperture therein, a flexible diaphragm for sealing said aperture, pivotable lever means passing through said aperture and rigidly attached to the center of said diaphragm and extending away from said diaphragm on both sides thereof, and means for pivotally supporting said lever means comprising rigid support means having two portions fixedly positioned respectively in spaced relation from diametrically opposite edge portions of said diaphragm, a rigid yoke member having its midportion rigidly attached to said lever means on one side of said diaphragm and having its ends located respectively adjacent said diametrically opposite edge portions, and a pair of rectilinear torsion springs each having one end rigidly attached to a respective portion of said rigid support means and the other end rigidly attached to a respective end of said yoke member so that said springs have a common longitudinal axis which lies substantially in the plane of said diaphragm to prevent axial movement of said lever means and said diaphragm while permitting twisting of said springs about said common spring axis and pivoting of said lever means about said common spring axis.

6. In motion transmitting apparatus, a member having an aperture therein, a flexible sealing means for sealing said aperture, pivotable lever means passing through said aperture and rigidly attached to the center of said sealing means and extending away from said sealing means on both sides thereof, and means for pivotably supporting said lever means comprising rigid support means having two portions fixedly positioned respectively in spaced relation from diametrically opposite portions of said sealing means, a rigid yoke member having its midportion rigidly attached to said lever means on one side of said sealing means and having its ends located respectively adjacent said diametrically opposite edge portions, and a pair of rectilinear torsion springs each having one end rigidly attached to a respective portion of said rigid support means and the other end rigidly attached to a respective end of said yoke member so that said springs have a common longitudinal axis which lies substantially in the central plane of said sealing means to prevent axial movement of said lever means and said sealing means while permitting twisting of said springs about said common spring axis and pivoting of said lever means about said common spring axis.

References Cited in the file of this patent

UNITED STATES PATENTS

| | | |
|---|---|---|
| 849,418 | Nickerson | Apr. 9, 1907 |
| 1,972,815 | Anneren | Sept. 4, 1934 |
| 2,365,649 | Shaw | Dec. 19, 1944 |
| 2,606,447 | Boltinghouse | Aug. 12, 1952 |

FOREIGN PATENTS

| | | |
|---|---|---|
| 670,218 | Germany | Jan. 14, 1939 |
| 683,677 | Great Britain | Dec. 3, 1952 |